US011385038B2

(12) United States Patent
Day et al.

(10) Patent No.: US 11,385,038 B2
(45) Date of Patent: Jul. 12, 2022

(54) MEASURING TAPE WITH LOCK BUTTON GUARD

(71) Applicant: APEX BRANDS, INC., Apex, NC (US)

(72) Inventors: Adam Day, Apex, NC (US); Jonathan Beckwith, Charlotte, NC (US); Adam Baxter, Apex, NC (US); Vlad Patrangenaru, Ellicott City, MD (US)

(73) Assignee: APEX BRANDS, INC, Apex, NC (US)

( * ) Notice: Subject to any disclaimer, the term of this patent is extended or adjusted under 35 U.S.C. 154(b) by 0 days.

(21) Appl. No.: 17/043,386

(22) PCT Filed: Mar. 27, 2019

(86) PCT No.: PCT/UW2019/024284
§ 371 (c)(1),
(2) Date: Sep. 29, 2020

(87) PCT Pub. No.: WO2019/191234
PCT Pub. Date: Oct. 3, 2019

(65) Prior Publication Data
US 2021/0095947 A1 Apr. 1, 2021

Related U.S. Application Data

(60) Provisional application No. 62/649,621, filed on Mar. 29, 2018.

(51) Int. Cl.
G01B 3/10 (2020.01)
G01B 3/1046 (2020.01)
(Continued)

(52) U.S. Cl.
CPC ......... G01B 3/1046 (2020.01); G01B 3/1007 (2020.01); G01B 2003/1038 (2013.01)

(58) Field of Classification Search
CPC ........................... G01B 3/1046; G01B 3/1007
(Continued)

(56) References Cited

U.S. PATENT DOCUMENTS 2,510,939 A * 6/1950 Carlson ................ G01B 3/1041
242/375
5,746,004 A * 5/1998 Wertheim ............ G01B 3/1041
33/768

(Continued)

FOREIGN PATENT DOCUMENTS

JP 2000298002 A 10/2000

OTHER PUBLICATIONS

International Search Report and Written Opinion from related international application No. PCT/US2019/024284 dated Jun. 10, 2019.

(Continued)

Primary Examiner — George B Bennett
(74) Attorney, Agent, or Firm — Burr & Forman LLP

(57) ABSTRACT

A measuring tape device may include a housing having an aperture, a reel assembly defining an axis, a blade having a first end configured to extend from the housing through the aperture and a second end configured to be wound on the reel assembly, a locking assembly configured to alternately allow and prevent winding of the blade onto the reel assembly based on a position of the locking assembly, and a guard assembly comprising guard members extending on opposing lateral sides of the locking assembly to protect the locking assembly from impact.

20 Claims, 4 Drawing Sheets

(51) Int. Cl.
*G01B 3/1007* (2020.01)
*G01B 3/1005* (2020.01)

(58) Field of Classification Search
USPC .................................................. 33/767, 769
See application file for complete search history.

(56) References Cited

U.S. PATENT DOCUMENTS

| | | | |
|---|---|---|---|
| 7,007,401 B1 * | 3/2006 | Lin .................. | G01B 3/1041 |
| | | | 33/769 |
| 7,263,784 B1 | 9/2007 | Lee | |
| 7,726,039 B2 * | 6/2010 | Lee .................. | G01B 3/1041 |
| | | | 33/769 |
| 9,267,778 B2 | 2/2016 | Burch et al. | |
| 9,322,628 B2 * | 4/2016 | Burch ............... | G01B 3/1056 |
| 9,488,458 B2 * | 11/2016 | Phillips ............ | G01B 3/1084 |
| D782,350 S * | 3/2017 | Bridges ............ | G01B 3/1041 |
| | | | D10/72 |
| 9,746,301 B2 * | 8/2017 | Schneider ........ | G01B 3/1084 |
| 2007/0056182 A1 | 3/2007 | Di Bitonto et al. | |
| 2010/0325910 A1 | 12/2010 | Huang | |
| 2020/0208953 A1 * | 7/2020 | Beckwith ......... | G01B 3/1003 |

OTHER PUBLICATIONS

Office Action from related Chinese Application No. 201980023638.8 dated Sep. 1, 2021, all pages cited in its entirety.

* cited by examiner

MEASURING TAPE WITH LOCK BUTTON GUARD

CROSS REFERENCE TO RELATED APPLICATIONS

This application claims priority to U.S. application No. 62/649,621 filed Mar. 29, 2018, the entire contents of which are hereby incorporated by reference in its entirety.

TECHNICAL FIELD

Example embodiments generally relate to measuring tape devices, and particularly relate to a measuring tape that has a lock button guard.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

The reel assembly can often also be locked at a given location so that, for example, the measuring tape can be locked with a given amount of the metallic tape ribbon extending out of the housing of the measuring tape. The locking mechanisms that support this functionality are typically embodied as a sliding lock button that is disposed on a top and/or front portion of the measuring tape housing. The lock button therefore tends to extend outwardly, to at least some degree, from the housing. This extension may leave the lock button vulnerable to damage if the measuring tape is dropped or otherwise encounters impact. To address this potential vulnerability, some measuring tapes have provided the lock button to have a very low profile. However, such a low profile design negatively impacts the ergonomics of the lock button and the user has reduced mechanical advantage during button actuation. Thus, having a measuring tape device with a more robust protective system for the lock button, can be very attractive to consumers.

BRIEF SUMMARY OF SOME EXAMPLES

Some example embodiments may enable the provision of a measuring tape that has a guard around the lock button. The lock button can therefore be provided to give optimal ergonomics and mechanical advantage to the operator without sacrificing vulnerability to impact damage.

In an example embodiment, a measuring tape device is provided. The measuring tape device may include a housing having an aperture, a reel assembly defining an axis, a blade having a first end configured to extend from the housing through the aperture and a second end configured to be wound on the reel assembly, a locking assembly configured to alternately allow and prevent winding of the blade onto the reel assembly based on a position of the locking assembly, and a guard assembly comprising guard members extending on opposing lateral sides of the locking assembly to protect the locking assembly from impact.

In another example embodiment, a guard assembly for protecting a locking assembly configured to lock an extended blade of a measuring tape device is provided. The guard assembly may include a first guard member extending along a first lateral side of the locking assembly, and a second guard member extending along a second lateral side of the locking assembly, where the second side is opposite the first side.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 4A:
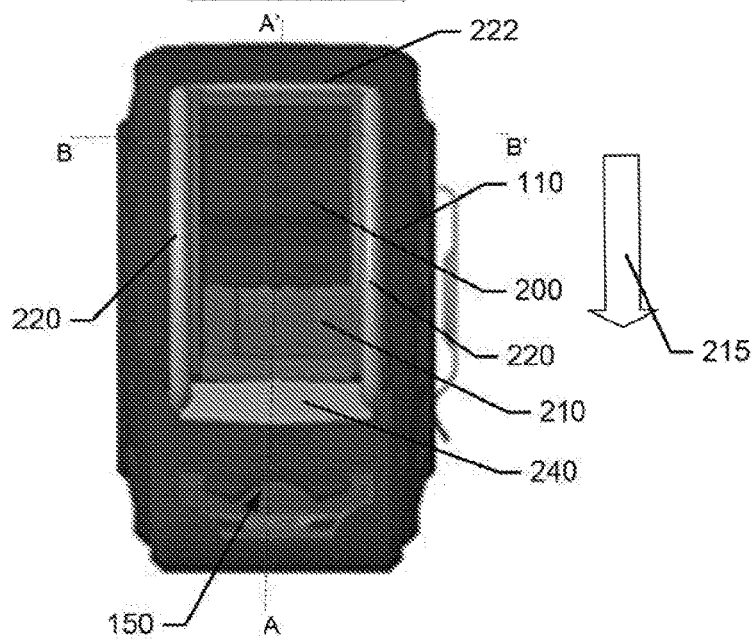
Figure 4C:
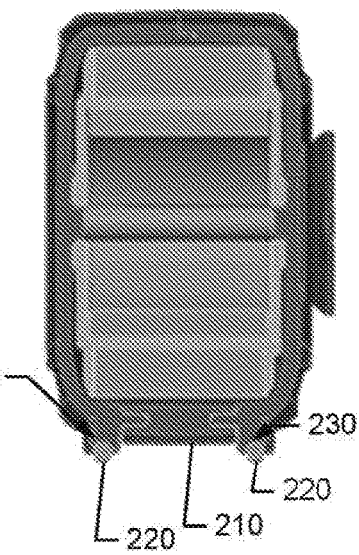
Figure 4B:
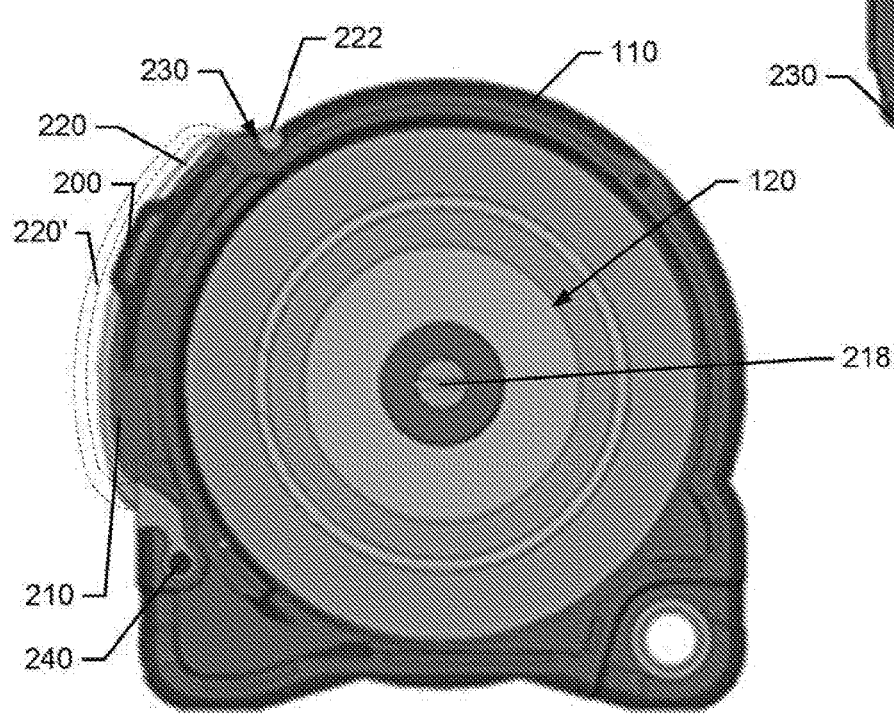
Figure 5A:
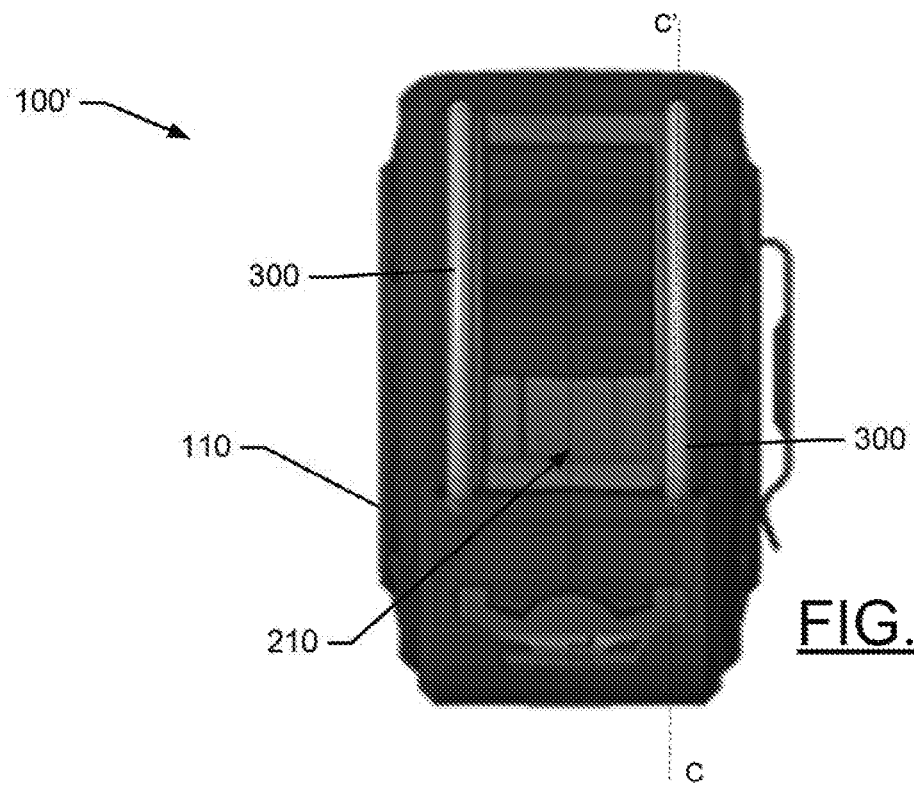
Figure 5B:
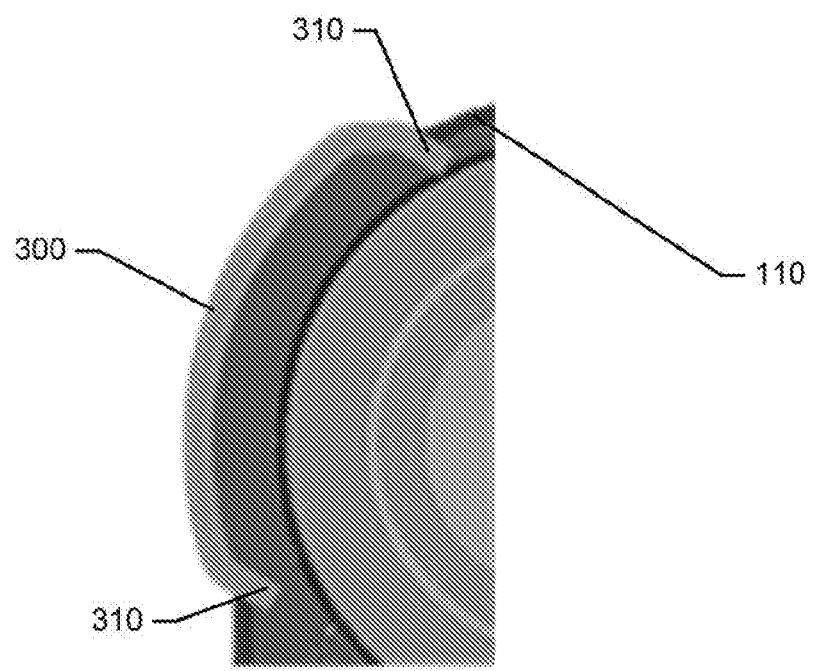

FIG. 3, which is defined by FIGS. 3A, 3B, 3C, 3D, 3E, and 3F, illustrates various stages of assembly of the guard assembly on the measuring tape device in accordance with an example embodiment;

FIG. 4A illustrates a front view of the measuring tape device in accordance with an example embodiment;

FIG. 4B illustrates a cross section view of the measuring tape device of FIG. 4A taken along line A-A' in accordance with an example embodiment;

FIG. 4C illustrates a cross section view of the measuring tape device of FIG. 4A taken along line B-B' in accordance with an example embodiment;

FIG. 5A illustrates a front view of the measuring tape device having a different guard assembly in accordance with an example embodiment; and FIG. 5B illustrates a cross section view of the measuring tape device of FIG. 5A taken along line C-C' in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
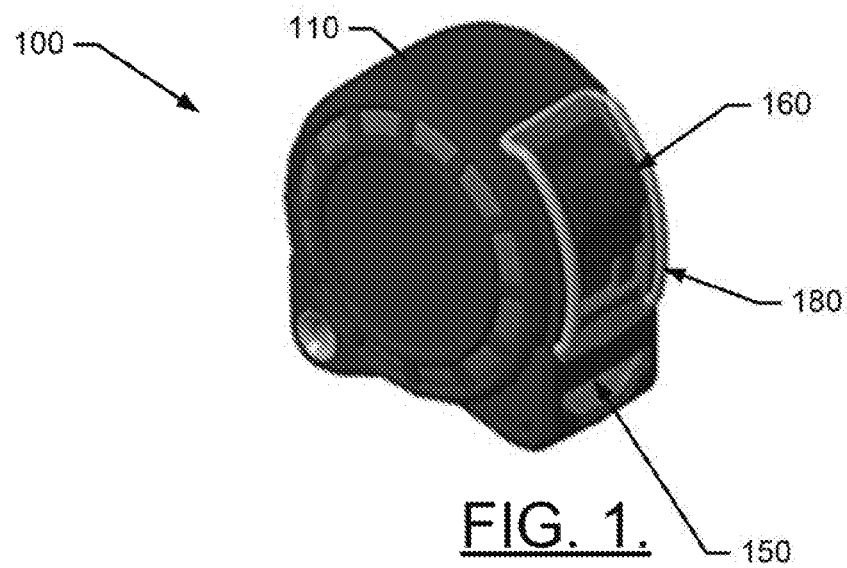
FIG. 1 illustrates a perspective view of a measuring tape device in accordance with an example embodiment.

As indicated above, some example embodiments may relate to the provision of a measuring tape device that may have an improved protection system for the lock button. This may be accomplished by providing a guard rail structure to protect the opposing lateral sides of the lock button. FIG. 1 illustrates a perspective view of a measuring tape device, and FIG. 2 illustrates a block diagram of such device, in accordance with an example embodiment.

Figure 2:
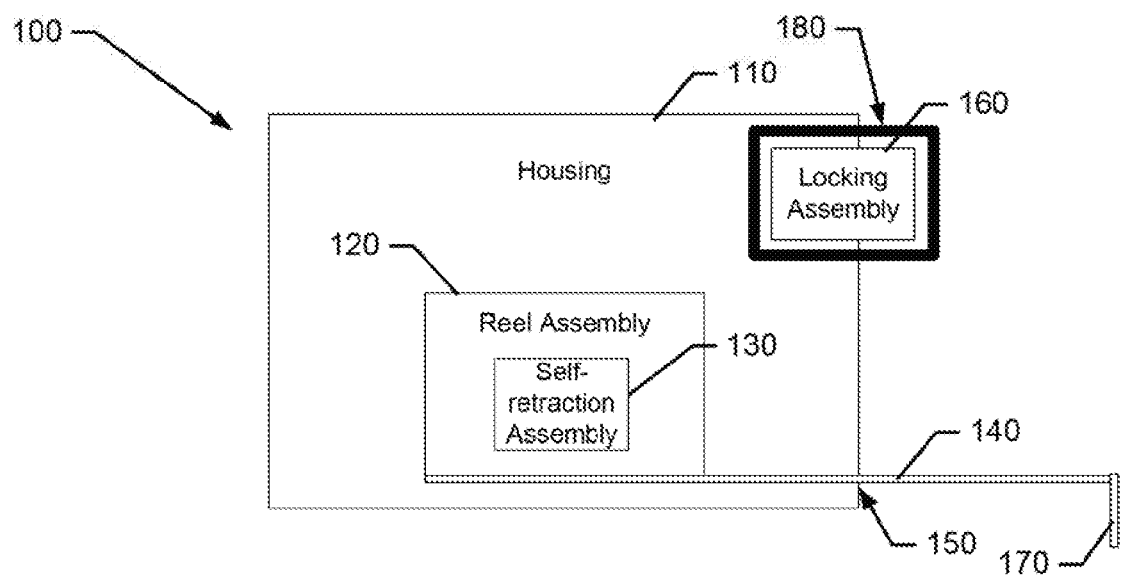
FIG. 2 illustrates a block diagram of the measuring tape device in accordance with an example embodiment.

Referring now to FIGS. 1 and 2, a measuring tape device 100 of an example embodiment may include a housing 110 inside which a reel assembly 120 and a self-retraction assembly 130 may be provided. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140 when longer lengths are extended). The blade 140 can be extended in a guided fashion toward an intended target anchor point while the blade 140 continues to have sufficient rigidity to standout. When the blade 140 has been extended to allow the end hook 170 to engage the anchor point, or when the operator manually places the end hook 170 at the anchor point, the blade 140 can be extended to perform any intended measurements so long as the end hook 170 remains fixed at the anchor point.

For a typical, flat piece of media that is being measured, the blade 140 (which generally has a shallow U-shaped cross section) lays across the media and the end hook 170 engages the anchor point such that the media and the anchor point are both below the blade 140 (or at least on the same side of the blade 140). However, it is possible that measurements may be desirable in other orientations for the blade 140 and the end hook 170. In either case, particularly for repeated measurements of similar lengths, the locking assembly 160 may be used to retain a fixed amount of the blade 140 being extended (and locked) out of the aperture 150. In some cases, the locking assembly 160 may be slid, toggled or otherwise moved between a locked position and an unlocked position. In the locked position, a force (e.g., a pinch force) is exerted on the blade 140 or on a portion of the reel assembly 120 or self-retraction assembly 130 to prevent the self-retraction assembly 130 from drawing the blade 140 back onto the reel assembly 120 in an automatic fashion. In the unlocked position, the self-retraction assembly 130 is generally not inhibited from retracting the blade 140 onto the reel assembly 120 responsive to some amount of the blade 140 being withdrawn through the aperture 150 and not being held in such position.

As shown in FIGS. 1 and 2, a guard assembly 180 may be defined substantially around at least the lateral edges of the locking assembly 160. However, in some cases, the guard assembly 180 may be defined around all edges of the locking assembly 160, as will be discussed in greater detail below. The guard assembly 180 may be configured to extend away from the housing 110 (relative to an axis of the drum of the reel assembly 120) by a distance greater than a majority (and perhaps all) of the locking assembly 160. As such, the guard assembly 180 can shield the locking assembly 160 to either prevent or at least mitigate impact on the locking assembly 160 (e.g., due to dropping the measuring tape device 100).

The specific structures used to embody both the locking assembly 160 and the guard assembly 180 may vary in different example embodiments. FIG. 3, which is defined by FIGS. 3A, 3B, 3C, 3D, 3E and 3F, illustrates operations associated with assembly of one set of structures that form the guard assembly 180 of an example embodiment. FIG. 4, which is defined by FIGS. 4A, 4B, and 4C, illustrates alternate views of the structures that form the guard assembly 180 of an example embodiment. In this regard, FIG. 4A illustrates a front view of the measuring tape device 100 employing the set of structures that form the guard assembly 180 as shown in FIG. 3. FIG. 4B illustrates a cross section view taken along line A-A' shown in FIG. 4A. FIG. 4C illustrates a cross section view taken along line B-B' shown in FIG. 4A.

Referring now to FIGS. 3 and 4, the locking assembly 160 may include a lock button 200 and a lock button track 210. The lock button track 210 may be formed of plastic, metal or other rigid materials to define a track within which the lock button 200 is slidable to shift between the locked position and the unlocked position. In an example embodiment, the lock button 200 may be slid within the lock button track 210 in the direction of arrow 215 to move to the locked position, and may be slid in the opposite direction to that shown by arrow 215 to transition to the unlocked position. It should be appreciated that, in some cases, the locking assembly 160 may be embodied as a toggle switch that toggles forward and rearward instead of sliding. In either case, the lock button track 210 may be a physical structure that supplies support to the lock button 200 to enable the lock button 200 to move as needed to facilitate transitioning between the locked and unlocked positions. In some cases, the lock button track 210 may be molded or otherwise formed as a separate component that interfaces with the housing 110. In such cases, either or both of the housing 110 and the lock button track 210 may be formed as two half-shells that are joined together. Moreover, in some embodiments, the lock button track 210 and the housing 110 may interface with each other in such a way that the clamping together of the two half-shells of the housing 110 also holds the lock button track 210 in its corresponding position within the measuring tape device 100. In some cases, even though the lock button track 210 may be a separately molded component, the lock button track 210 may lock button track 210 may effectively be or form a portion of the housing 110 when operably coupled therewith.

The lock button 200 may have a width that is sized to enable the lock button 200 to slide (or toggle) within the lock button track 210. Meanwhile, the length of the lock button 200 may be small enough to allow the lock button 200 to have sufficient range of motion within the lock button track 210 to cause a transition between the locked position and the unlocked position. The structures and interfaces that actually implement locking and unlocking are outside the scope of the present disclosure.

As shown primarily in FIG. 4B, the housing 110 may have an arcuate portion that defines a constant radius from an axis 218 of the reel assembly 120. The arcuate portion of the housing 110 may extend substantially over an entirety of the top of the measuring tape device 100, and also over a majority of the front and back of the measuring tape device 100. Lateral sides of the housing 110 may extend from the arcuate portion to the bottom portion of the housing 110 to define the enclosure formed by the housing 110. Meanwhile, the lock button track 210 may also define an arcuate portion that extends over a portion of the front of the measuring tape device 100. The arcuate portion of the lock button track 210 may have a slightly larger radius than the radius of the arcuate portion of the housing 110. The lock button 200 may have a base portion that is also arcuate in shape and that rides in the lock button track 210, and may have a protruding portion that extends away from the base portion and the axis 218 by a distance that is larger than both the radius of the arcuate portion of the housing 110 and the radius of the arcuate portion of the lock button track 210.

The guard assembly 180 may be defined by wire guards 220 disposed to extend along lateral edges of the lock button track 210. The wire guards 220 may extend in an arcuate shape that corresponds to the shape of the lateral edges or the lock button track 210. In some cases, a connecting wire 222 may be disposed between ends of the wire guards 220 that terminate at a top portion of the lock button track 210. The connecting wire 222 may therefore extend substantially perpendicular to the direction indicated by arrow 215, while the wire guards 220 each extend substantially parallel to the direction indicated by arrow 215. In an example embodiment, the lock button track 210 may also define (e.g., at a top portion thereof, and perhaps also along sides thereof) a locking channel 230. The locking channel 230 may be configured to receive connecting wire 222 and/or the wire guards 220 therein when the measuring tape device 100 is fully assembled. Moreover, the connecting wire 222 and the wire guards 220 may combine to provide a clamping load on the components of the lock button track 210 and/or the housing 110 to facilitate holding the measuring tape device 100 together with fewer screw bosses being required.

Of note, the wire guards 220 are merely one example structure for guard members that may form the guard assembly 180, and other structures are also possible. Additionally, similar structures could also be employed, but using other materials. For example, in some cases, resin or other rigid materials could be used to form structures having the same (or similar) shape to those disclosed above for the wire guards 220 (and connecting wire 222). The guard members could, when formed from resin, be overmolded to other portions of the housing 110 to provide the same type of protection described above, except using a plastic or resin material instead of a metallic assembly of guard members.

As shown in FIGS. 4B and 4C, the wire guards 220 may be disposed a distance from the axis 218 that is larger than the both the radius of the arcuate portion of the housing 110 and the radius of the arcuate portion of the lock button track 210. However, in some cases, the protruding portion of the lock button 200 may extend beyond the wire guards 220 (as shown in FIG. 4B). Thus, any impact (e.g., due to falling, etc.) on the protruding portion of the lock button 200 may be mitigated or completely blocked by the wire guards 220 (depending on the angle of the impact relative to the lock button 200). However, it should be noted that the wire guards 220 could be spaced apart from the surface of the housing 110 and/or the edges of the lock button track 210 in some cases, as shown by dashed line wire guards 220' in FIG. 4B.

In an example embodiment, the end of the wire guards 220 that is opposite the connecting wire 222 may include terminal portions 224 that extend inwardly toward each other (and therefore parallel to the direction of extension of the connecting wire 222. The terminal portions 224 may facilitate placing a clamping load on the housing 110 and/or the lock button track 210 and may be inserted into respective slots disposed at a portion of the housing 110 and/or lock button track 210. Alternatively or additionally, a face plate 240 may be provided to join the terminal portions 224 together (or cover them). In an example embodiment, the face plate 240 may have a portion that inserts into a channel 245 (which may be a portion of or otherwise lead to a screw boss) into which the screw 250 may be inserted. The screw 250 may therefore not only hold together the two half-shells that form the housing 110, but the screw 250 may also secure the guard assembly 180 to the housing 110.

Figure 3A:
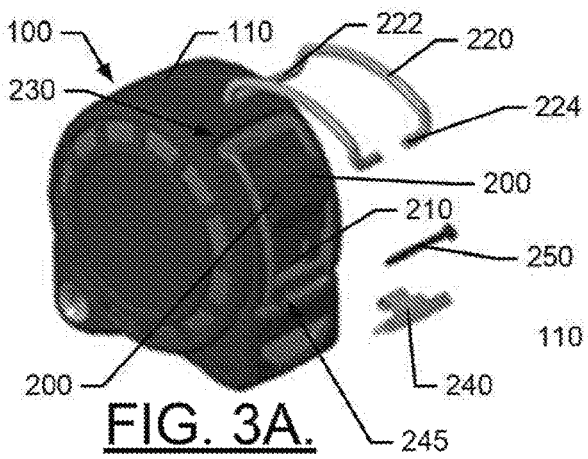
Figure 3B:
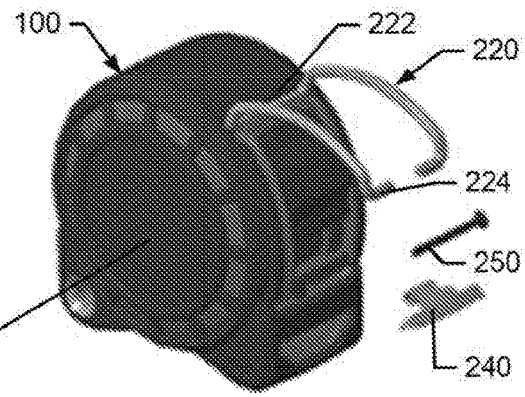
Figure 3C:
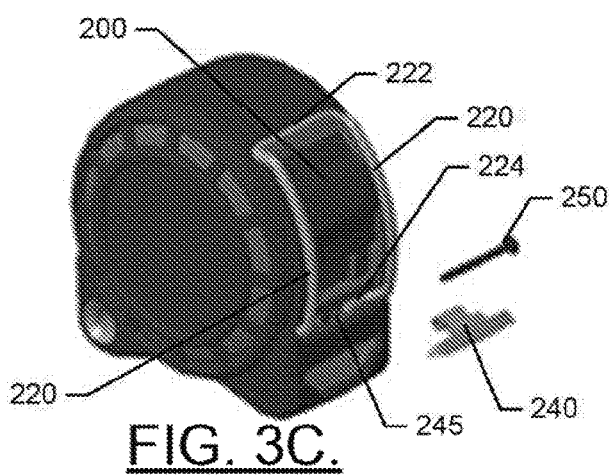
Figure 3D:
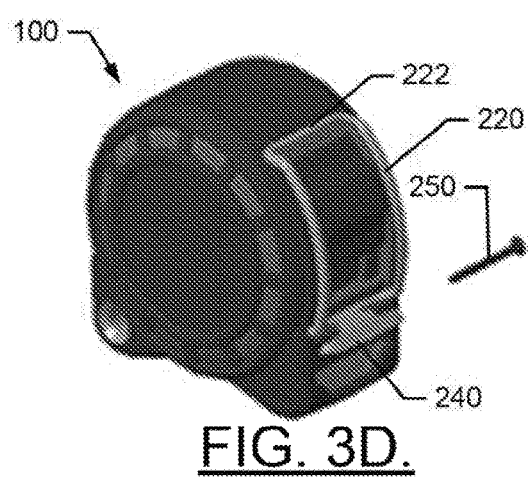
Figure 3E:
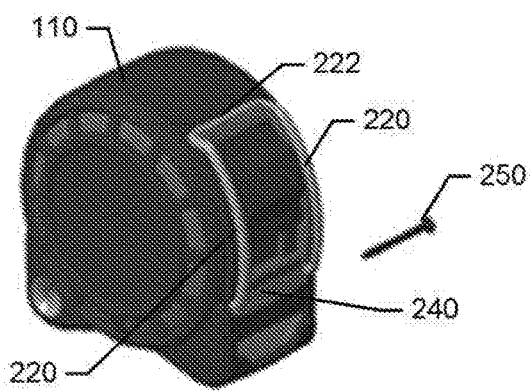
Figure 3F:
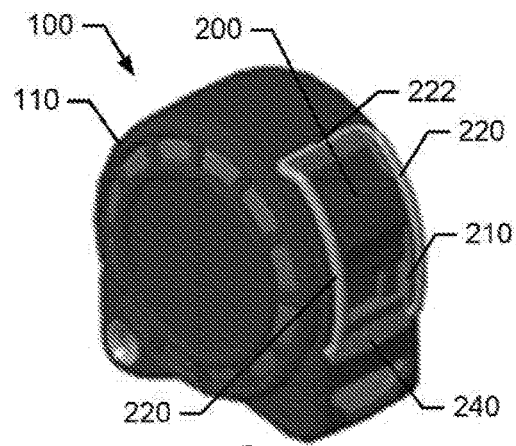

Referring to FIG. 3, the guard assembly 180 may be installed by assembling the components shown in FIG. 3A. Initially, as shown in FIG. 3B, the connecting wire 222 may be placed into the locking channel 230 (or the portion thereof that extends transversely across the top portion of the lock button track 210). The wire guards 220 may then be rotated downwardly until the terminal ends 224 contact the housing 110 and/or the bottom portion of the lock button track 210 as shown in FIG. 3C. At this point, the wire guards 220 may also be in portions of the locking channel 230 that extend along lateral sides of the lock button track 210. However, if the alternate wire guard 220' design is employed, there may not be any such portions of the locking channel 230. FIG. 3D shows the insertion of the face plate 240 into the channel 245. Once the face plate 240 is in place, as shown in FIG. 3E, the screw 250 can be installed. When the screw 250 is installed, final assembly of the measuring tape device 100 is complete, as shown in FIG. 3F.

Various modifications to the design example described above are, of course, possible. In this regard, the connecting wire 222 and the face plate 240 could be removed in some cases. In such cases, still another alternative design for wire guards 300 may be provided. FIGS. 5A and 5B illustrate an example design which employs such wire guards 300. In this regard, FIG. 5A illustrates a front view of an alternate measuring tape device 100' that includes wire guards 300 that only extend along lateral edges of the lock button track 210, while FIG. 5B illustrates a cross section view taken along line C-C' of FIG. 5A.

The fact that the wire guards 300 of FIGS. 5A and 5B are separated from each other provides additional flexibility regarding where in the manufacturing process the wire guards 300 are integrated into the housing 110. Each of the wire guards 300 may be co-molded or insert molded into a respective half-shell of the housing 110, or the wire guards 300 may be assembled into the respective half-shell of the housing 110 prior to final assembly. Terminal ends 310 of the wire guards 300 may be configured to the manufacturing approach selected (e.g., co-molding or assembling), with prefabricated bends at the terminal ends 310 for co-molding to prevent shear-out, and post-assembly bends or crimps to be used for the same purpose for post-injection assemblies.

Accordingly, as can be appreciated from the examples above, the guard assembly 180 may be constructed to define continuous contact with the measuring tape device 100 (at either or both of the housing 110 and the lock button track 210) along the full length of the guard assembly 180. Such a design may provide good impact durability, but may leave a small portion of the lock button 200 exposed due to extending beyond the radius of the arc defined by the wire guards 220 of the guard assembly 180. As such, an alternative design that leaves an intentional gap between at least part of the wire guards 220' and the measuring tape device 100 (at either or both of the housing 110 and the lock button track 210) may be provided to ensure that the lock button 200 does not extend away from the housing 110 by a distance greater than the radius of the arc defined by the wire guards 220'. This alternative design may provide a different (and perhaps preferable to some) aesthetic appeal, and may also provide weight optimization. In any case, example embodiments may reduce susceptibility of the lock button 200 to sustaining impact damage due to the protection offered by the guard assembly 180. As such, a more prominent lock button 200 can be employed to provide improved ergonomics and mechanical advantage for operators, without sacrificing durability.

In an example embodiment, a measuring tape device is provided. The measuring tape device may include a housing having an aperture, a reel assembly defining an axis, a blade having a first end configured to extend from the housing through the aperture and a second end configured to be wound on the reel assembly, a locking assembly configured to alternately allow and prevent winding of the blade onto the reel assembly based on a position of the locking assembly, and a guard assembly comprising guard members (e.g., made of resin or metallic wire) extending on opposing lateral sides of the locking assembly to protect the locking assembly from impact.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the guard assembly may be configured to be disposed in a locking channel to provide a clamping force to hold components of the housing together. In an example embodiment, the locking channel may secure the guard assembly to the housing at a first end of the guard assembly, and a threaded fastener may secure the guard assembly to the housing at a second end of the guard assembly. In some cases, the first and second ends of the guard assembly may be disposed proximate to respective top and bottom portions of the locking assembly. In an example embodiment, the locking channel may extend along at least three sides of the locking assembly. In some cases, the locking assembly includes a lock button, and the lock button slides within a lock button track to transition between a locked position and an unlocked position. The guard members may extend along lateral edges of the lock button track. In an example embodiment, the guard assembly may further include a connecting member that extends between corresponding first ends of the guard members. In an example embodiment, the guard assembly may further include a face plate that extends between corresponding second ends of the guard members. In some cases, the face plate may include a channel configured to receive a threaded fastener that joins opposing sides of the housing together. In an example embodiment, the connecting member may be disposed in a locking channel defined proximate to an interface between the housing and the lock button track. In some cases, the guard members may each be in continuous contact with a portion of the housing on opposing lateral edges of the locking assembly. In an example embodiment, a portion of a lock button of the locking assembly may extend away from the axis by a distance greater than a radius of an arcuate portion of the guard members. In some cases, the guard members may each be spaced apart from the housing on opposing lateral edges of the locking assembly. In an example embodiment, no portion of a lock button of the locking assembly may extend away from the axis by a distance greater than a radius of an arcuate portion of the guard members. In some cases, the guard assembly may be co-molded or insert molded with a portion of the housing, or may be installed onto the housing after assembly of other portions of the device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A measuring tape device comprising:
a housing having an aperture;
a reel assembly defining an axis;
a blade having a first end configured to extend from the housing through the aperture and a second end configured to be wound on the reel assembly;
a locking assembly configured to alternately allow and prevent winding of the blade onto the reel assembly based on a position of the locking assembly, the locking assembly comprising a lock button that slides within a lock button track; and a guard assembly comprising wire guards extending on opposing lateral sides of the lock button track and affixed to the housing at terminal ends of the wire guards to protect the locking assembly from impact.

2. The device of claim 1, wherein the guard assembly comprises a connecting wire connected between the wire guards;

wherein the connecting wire is configured to be disposed in a locking channel to provide a clamping force to hold components of the housing together.

3. The device of claim 2, wherein the locking channel secures the guard assembly to the housing at a first end of the guard assembly, and a threaded fastener secures the guard assembly to the housing at a second end of the guard assembly.

4. The device of claim 1, wherein the first and second ends of the wire guards are disposed proximate to respective top and bottom portions of lock button track.

5. The device of claim 2, wherein the locking channel extends along at least three sides of the locking assembly, and the at least three sides of the locking assembly comprise the lateral side of the locking assembly.

6. The device of claim 1, wherein the guard assembly further comprises a connecting member that extends between corresponding first ends of the wire guards.

7. The device of claim 6, wherein the guard assembly further comprises a face plate that extends between corresponding second ends of the wire guards.

8. The device of claim 7, wherein the face plate comprises a channel configured to receive a threaded fastener that joins opposing sides of the housing together.

9. The device of claim 6, wherein the connecting wire is disposed in a locking channel defined proximate to an interface between the housing and the lock button track.

10. The device of claim 1, wherein the wire guards are each in continuous contact with a portion of the housing on opposing lateral edges of the locking assembly.

11. The device of claim 10, wherein a portion of the lock button of the locking assembly extends away from the axis by a distance greater than a radius of an arcuate portion of the wire guards.

12. The device of claim 1, wherein the wire guards are each spaced apart from the housing on opposing lateral edges of the locking assembly.

13. The device of claim 12, wherein no portion of the lock button of the locking assembly extends away from the axis by a distance greater than a radius of an arcuate portion of the wire guards.

14. The device of claim 1, wherein the wire guards are insert molded or co-molded into respective half-shells of the housing.

15. The device of claim 1, wherein the guard assembly is installed onto the housing after assembly of other portions of the device.

16. A guard assembly for protecting a locking assembly comprising a lock button that slides within a lock button track configured to lock an extended blade of a measuring tape device, the guard assembly comprising:

a first wire guard extending along a first lateral side of the lock button track and affixed to a housing of the measuring tape device at terminal ends of the first wire guard; and a second wire guard extending along a second lateral side of the lock button track and affixed to a housing of the measuring tape device at terminal ends of the second wire guard, the second side being opposite the first side.

17. The guard assembly of claim 16, wherein the guard assembly further comprises a connecting member that extends between corresponding first ends of the first and second wire guards.

18. The guard assembly of claim 17, wherein the guard assembly further comprises a face plate that extends between corresponding second ends of the first and second wire guards.

19. The guard assembly of claim 18, wherein the first and second guard members are each in continuous contact with a portion of a housing of the measuring tape device on the first and second lateral sides of the locking assembly.

20. The device of claim 1, wherein the terminal ends of the wire guards are affixed to housing proximate to respective top and bottom portions of lock button track.

* * * * *